INVENTOR
Harold G. Witmer.
BY
HIS ATTORNEY

Patented June 13, 1933

1,913,578

UNITED STATES PATENT OFFICE

HAROLD G. WITMER, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

LIGHT SIGNAL

Application filed May 12, 1931. Serial No. 536,730.

My invention relates to light signals, and has for an object the provision of a signal of the searchlight type, wherein the indication may change from caution to proceed, and vice versa, without giving a momentary flash of the stop indication.

I will describe one form of signal embodying my invention, and will then point out the novel features thereof in claims.

Figure 1:
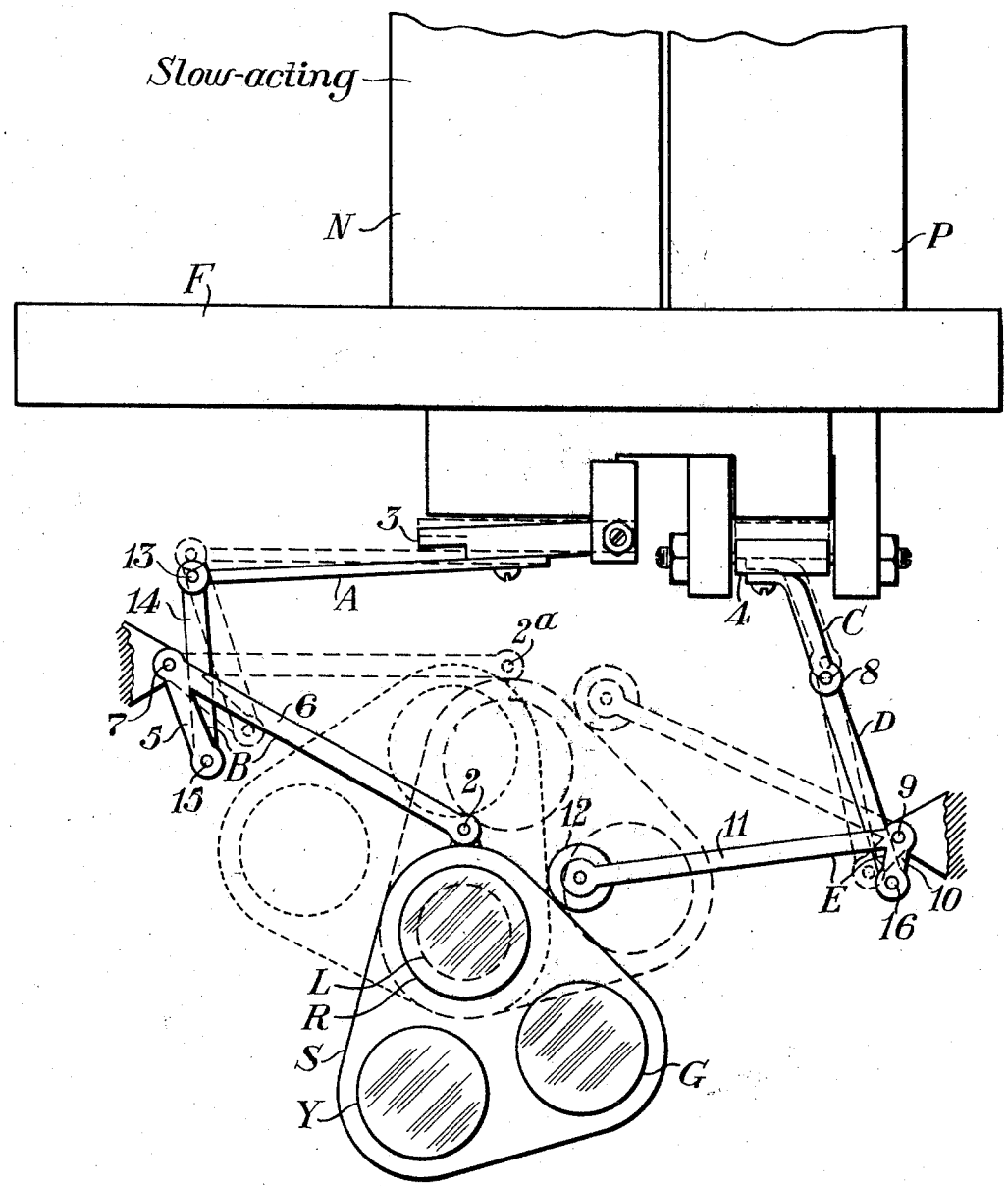
Figure 2:
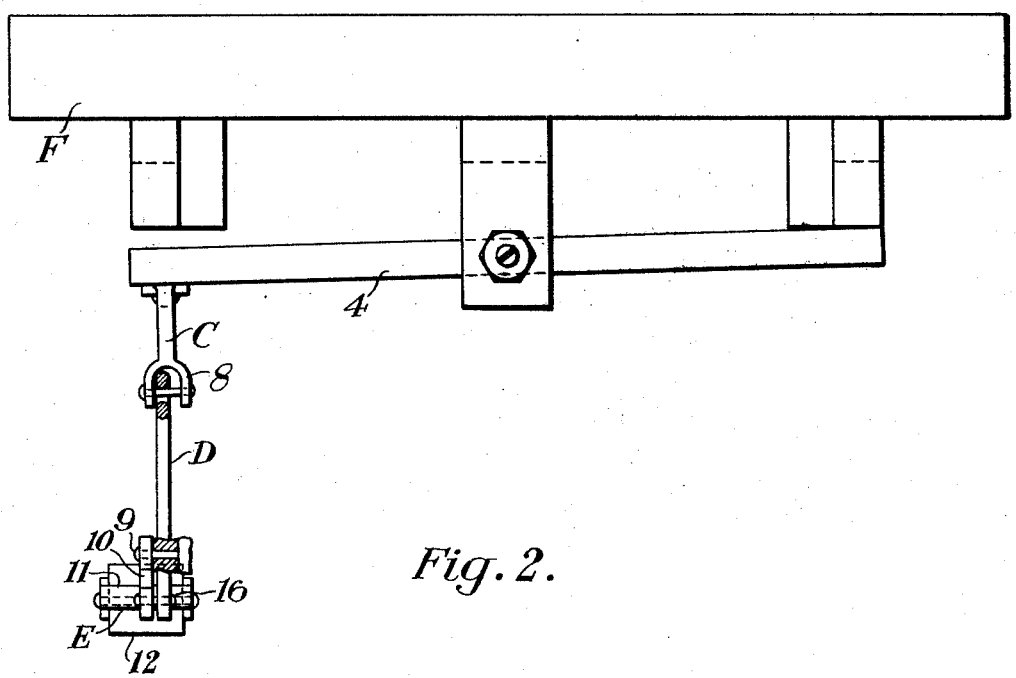
Figure 3:
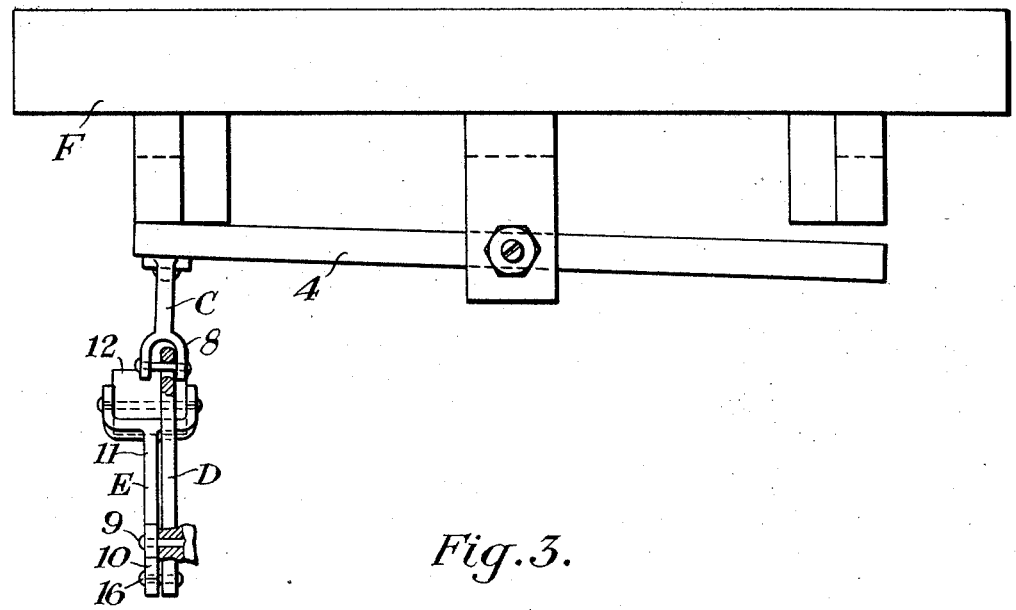

In the accompanying drawings, Fig. 1 is a view showing in front elevation one form of signal embodying my invention. Fig. 2 is a right-hand side view of a portion of the signal illustrated in Fig. 1, showing the polar armature 4 and associated parts in the positions corresponding to their full line positions in Fig. 1. Fig. 3 is a view similar to Fig. 2, but showing the polar armature 4 and associated parts in the positions corresponding to their dotted line position in Fig. 1.

Similar reference characters refer to similar parts in all three views.

Referring to the drawings, the signal comprises a spectacle S pivotally suspended at a point 2 from an arm 6 of a lever B. The spectacle is provided with three distinctive colored screens, R, Y and G, arranged in triangular formation with the screen R at the top, and the screens Y and G side by side below the screen R. The signal is provided with a source of light L. Screen R may, for example, be red, and when this screen is in the path of the rays from the light source L, it causes the signal to give a stop indication. The screen Y may be yellow, and when this screen is in the path of the rays from the light source L, it causes the signal to give a caution indication. Screen G may be green, and when this screen is in the path of the rays from the light source L it causes the signal to give a proceed indication.

The spectacle S is biased by gravity to the position in which it is shown in solid lines in the drawings, and in this position the red screen R is in the path of light from the source L. When the pivotal point 2 is raised to the position indicated at $2^a$ in the drawings, and no other force is brought to bear on the spectacle, the spectacle will assume the position in which it is illustrated in long dash lines in the drawings wherein the yellow screen Y will be in the path of light from the source L. If now the spectacle is swung to the left around the pivotal point 2 as a center, it will assume the position in which it is shown in short dash lines in the drawings, and when in this position the screen G will be in the path of light from the source L.

Mechanisms of various types may be employed for raising the pivotal point 2 of the spectacle S, and for swinging this spectacle around the pivotal point as an axis. As here shown, the operating mechanism involves a polarized relay having two neutral windings N (one of which is directly behind the other in the drawings), and a polar magnet P. The neutral magnet N controls a neutral armature 3, and the polar magnet P controls a polar armature 4. Attached to the neutral armature 3 is an arm A which is pivotally connected at point 13 with a link 14, the other end of which link is connected at point 15 with one arm 5 of the crank B. This crank is pivotally attached to a fixed support at point 7, and its other arm 6 supports the pivotal axis 2 of the spectacle S as hereinbefore stated. The parts are so arranged that when the armature 3 is released, the spectacle occupies its lowermost position and the operating elements thus far described assume the positions in which they are shown in solid lines in the drawings. When the armature 3 is attracted, the operating parts assume the positions in which they are shown in dash lines. That is to say, crank B is swung in counter-clockwise direction to raise the pivotal support of spectacle S from the point 2 to the point $2^a$.

Attached to the polar armature 4 is a link

C which is connected with a second link D by a universal joint 8. The lower end of link D is connected at point 16 with an arm 10 of a crank E, which crank is pivotally attached at a point 9 to a fixed support. The other arm 11 of the crank E is provided with a roller 12, which cooperates with the right-hand side of the spectacle S. When the polar armature 4 occupies its normal position, in which position it is shown in Fig. 2, crank E will be held rigidly in the position in which it is shown in solid lines in Fig. 1, so that as the spectacle S is raised by crank B, it will be swung in clockwise direction around its pivotal support 2 as a center, thereby causing the green screen G to move into the path of rays from the light rays L. When the polar armature 4 occupies its reverse position, however, as shown in Fig. 3 the crank E will be swung in clockwise direction to the position in which it is shown in dash lines in Fig. 1, so that it will have no influence on the position of the spectacle S.

Assuming that the polar relay is deenergized, and that it then becomes energized in the reverse direction, the spectacle S will be raised but will not be swung around its pivotal axis, and so the signal will give the caution indication. If now, the polar relay becomes energized in the normal direction, the crank E will swing the spectacle S in clockwise direction, so that the indication will change from caution to proceed. It will be observed that during this change, the red screen R does not pass through the path of rays from the light source L, and so the signal will not give a momentary stop indication. The same thing will be true when the polarity of the current supplied to the relay changes from normal to reverse.

Preferably the neutral coils N are slow-acting, and the polar coil P is quick-acting, so that during a change of the polarity of the current supplied to the relay the neutral armature 3 will not release. This will prevent the spectacle S from dropping during the reversal of the latter.

Although I have herein shown and described only one form of signal embodying my invention, it is understood that various changes and modifications may be made therein within the scope of the appended claims without departing from the spirit and scope of my invention.

Having thus described my invention, what I claim is:

1. A light signal comprising a source of light, a spectacle having three distinctively colored screens arranged in triangular formation and adapted when in the path of light from said source to cause the signal to indicate stop, caution and proceed respectively, said spectacle being biased to such position that the stop screen is in the path of light from said source, means for moving said spectacle in one direction against the biasing force to such position that the caution screen is in the path of light from said source, and means operable when the spectacle has been moved by said first means to move it in another direction against the biasing force to bring said proceed screen into the path of the light from said source.

2. A light signal comprising a source of light, a spectacle having three distinctively colored screens arranged in triangular formation and adapted when in the path of light from said source to cause the signal to indicate stop, caution and proceed respectively, said spectacle being pivotally suspended from its top and biased by gravity to a lower position wherein the stop screen is in the path of light from said source, means for raising the pivotal point of said spectacle to bring the spectacle into such position that the caution screen is in the path of light from said source, and means for swinging said spectacle around said pivotal point to bring the spectacle into such position that the proceed screen is in the path of light from said source when the spectacle is raised by said first means.

3. A light signal comprising a source of light, a spectacle having three distinctively colored screens arranged in triangular formation and adapted when in the path of light from said source to cause the signal to indicate stop, caution and proceed respectively, said spectacle being pivotally suspended from its top and biased by gravity to a lower position wherein the stop screen is in the path of light from said source, a polarized relay having a neutral armature and a polar armature, means operating when said neutral armature is attracted to raise the pivotal point of said spectacle to bring the spectacle into such position that the caution screen is in the path of light from said source, and means operating when said polar armature is swung in one direction but not in the other to swing said spectacle around said pivotal point to bring the spectacle into such position that the proceed screen is in the path of light from said source provided the neutral armature is attracted.

4. A light signal comprising a source of light, a spectacle having three distinctively colored screens arranged in triangular formation and adapted when in the path of light from said source to cause the signal to indicate stop, caution and proceed respectively, said spectacle being pivotally suspended from its top and biased by gravity to a lower position wherein the stop screen is in the path of light from said source, a polarized relay having a neutral armature and a polar armature, means operating when said neutral armature is attracted to raise the pivotal point of said spectacle to bring the spectacle into such position that the caution screen is in the path of light from said source, and means operating when said polar armature is swung in one direction but not in the other to swing said spectacle around said pivotal point to bring the spectacle into such position that the proceed screen is in the path of light from said source provided the neutral armature is attracted, the neutral magnet of said relay being slow acting and the polar magnet quick acting so that the neutral armature will not release when the polarity of the current supplied to the relay is reversed.

In testimony whereof I affix my signature.

HAROLD G. WITMER.